United States Patent [19]

Schembri

[11] Patent Number: 4,673,246
[45] Date of Patent: Jun. 16, 1987

[54] PATCH UNIT FOR FIBER OPTIC DISTRIBUTION NETWORK

[75] Inventor: John J. Schembri, Daly City, Calif.

[73] Assignee: Pacific Bell, San Francisco, Calif.

[21] Appl. No.: 644,318

[22] Filed: Aug. 24, 1984

[51] Int. Cl.⁴ .............................. G02B 6/40; G02F 1/00
[52] U.S. Cl. .................. 350/96.22; 350/96.15;
  350/96.16; 350/96.20; 350/96.21; 455/600;
  455/612
[58] Field of Search ............. 350/96.10, 96.15, 96.16,
  350/96.24, 96.20, 96.22, 96.21; 455/600, 601,
  612, 617, 618, 619

[56] References Cited

U.S. PATENT DOCUMENTS

| | | | |
|---|---|---|---|
| 4,015,115 | 3/1977 | Corcoran | 455/600 X |
| 4,061,577 | 12/1977 | Bell | 455/600 X |
| 4,182,935 | 1/1980 | Chown | 350/96.15 X |
| 4,187,404 | 2/1980 | Deman et al. | 455/600 X |
| 4,261,641 | 4/1981 | Porter | 350/96.16 |
| 4,266,853 | 5/1981 | Hutchins et al. | 350/96.20 |
| 4,306,313 | 12/1981 | Baldwin | 455/601 |
| 4,332,435 | 6/1982 | Post | 350/96.20 |
| 4,359,262 | 11/1982 | Dolan | 350/96.20 |
| 4,367,548 | 1/1983 | Cotten, Jr. et al. | 370/3 |
| 4,373,776 | 2/1983 | Purdy | 350/96.20 |
| 4,418,982 | 12/1983 | Williams | 350/96.20 |
| 4,500,166 | 2/1985 | Kunze | 350/96.20 |
| 4,502,754 | 3/1985 | Kawa | 350/96.20 |
| 4,555,810 | 11/1985 | Khoe et al. | 350/96.15 X |
| 4,585,303 | 4/1986 | Pinsard et al. | 350/96.21 |
| 4,606,603 | 8/1986 | Cairns | 350/96.21 |
| 4,619,499 | 10/1986 | Gerber | 350/96.20 |

*Primary Examiner*—William L. Sikes
*Assistant Examiner*—Brian M. Healy
*Attorney, Agent, or Firm*—Fitch, Even, Tabin & Flannery

[57] ABSTRACT

A patch unit is disclosed for use in a fiber optic distribution system or the like for selectively providing user access to one or more optical fibers while maintaining continuity in remaining optical fibers. The patch unit includes first and second fanouts for respectively receiving and separating opposite ends of the plurality of optical fibers, optical fiber connectors each including first and second opposed ports for respectively receiving optical fibers and establishing communication access therebetween, the fibers from both fanouts being arranged in the first ports of the connectors, the second ports of the connectors being disposed in accessible alignment for facilitating selectively arrangement therein of user fibers for establishing communication access with selected fibers from the fanouts, the second ports associated with remaining fibers from the fanouts being interconnected with each other by jumper fibers for maintaining continuity for those fibers through the patch unit. Additional fibers are interconnected by splices in a splice chamber associated with the patch unit, both the patch unit and splice chamber being enclosed by a cover and arranged in an outer housing or splice case in order to provide protection for the entire assembly.

1 Claim, 3 Drawing Figures

PATCH UNIT FOR FIBER OPTIC DISTRIBUTION NETWORK

BACKGROUND OF THE INVENTION

The present invention is directed toward a patch unit for use in fiber optic distribution systems and the like and more particularly to such a patch unit adapted for being particularly versatile and efficient.

Communication systems of the type contemplated for use with the patch unit of the present invention were initially established for transmission of various types of information including audio, video and digital data in the form of electrical signals through electrical transmission lines. Such information may of course include telephone signals, television signals, digital data, FM audio signals and the like. More recently, these electrical conductors have commonly been replaced by optical transmission systems where the information is transmitted through cables or the like formed from optical fibers.

The fiber optic cable may be in the form of one or more individual fibers or it may take the form of a bundle of many fibers. Here again, large numbers of fibers may be assembled in sets such as ribbons each including a flat array of, for example, 12 fibers. On the other hand, all or part of the fibers may be individually buffered, that is, contained within separate plastic tubes of relatively larger diameter to facilitate handling of the fibers and protect them from damage. In any event, fiber optical systems have become particularly desirable for such applications because of their bandwidth capabilities for handling greatly increased amounts of information, particularly in comparison with electrical transmission lines.

With the expanding use of such fiber optic systems, generally the same configurations of distribution networks have been employed for providing communications to given sets of users as in the earlier electrical communication systems. For example, service to large numbers of users in a given area, such as a city, university or other complex, has been established with central offices or hubbing locations for providing service to groups of users in generally localized areas. A hubbing location commonly replaces a central office in localized areas such as universities and the like. The hubbing location is then interconnected with a central office by a trunk line for associating it with other communication networks. Accordingly, the term "central office" is used broadly in connection with the present invention and includes hubbing locations and other alternative means.

In order to provide service for each user from the central office, it has been common practice to provided dedicated lines between the central office and each given user through local networks in the form of conventional star or bus configurations for example. With large numbers of users in a fixed location such as large buildings or portions of a university, large numbers of lines have been assembled in cables or the like to facilitate interconnection of all of the users with the central office.

At the same time, it has been necessary to provide for changes in the numbers and locations of such users within a given area. In the past, this was accomplished by shifting of dedicated lines from one user to another. Thus, where shifting patterns of users have occurred, it has often been necessary to reroute entire cables or portions of cables at very considerable expense.

A solution to this particular problem has been achieved in a manner disclosed in a co-pending patent application Ser. No. 644,206, entitled FIBER OPTIC DISTRIBUTION NETWORK, filed Aug. 24, 1984. the invention of that co-pending reference being assigned to the assignee of the present invention.

The above noted co-pending reference discloses a fiber optic distribution system for overcoming problems of the type outlined above. In particular, the co-pending reference discloses a method and apparatus for forming a fiber optic distribution system for providing communication access from a central office to a group of users generally in a localized area. For that purpose, the system of the co-pending reference contemplates a continuous optical fiber primary loop arranged to pass in the vicinity of each user in the group, the invention contemplating means arranged at spaced apart intervals along the primary loop for permitting selective interconnection of the users with the primary loop in order to place them in communication access with a central office. At the same time, fibers in the loop which are not employed for those users are interconnected in order to establish continuity throughout the loop. Thus, the additional fibers may be used for servicing users adjacent other points in the loop.

To make the fiber optic distribution system of the co-pending reference more effective and versatile, it is necessary to provide means at spaced apart locations about the primary loop for permitting users to be selectively interconnected with one or more fibers in the loop while continuity is established for the remaining fibers. It will be apparent that a device capable of satisfying this particular function within the fiber optic distribution system of the co-pending reference will also be useful in other fiber optic applications.

SUMMARY OF THE INVENTION

It is therefore an object of the invention to provide a patch unit suitable for use in a fiber optic distribution system or the like for selectively providing user access to one or more optical fibers while maintaining continuity in additional fibers.

It is a more specific object of the invention to provide such a patch unit which is particularly adapted for use in a continuous optical fiber primary loop as disclosed in the above noted co-pending reference in order to permit selective communication access for one or more users at different points along the primary loop.

It is an even further object of the invention to provide such a patch means which permits the selective interconnection of user fibers with one or more fibers in a fiber optic distribution system while permitting interconnection of additional fibers at the patch unit for maintaining continuity therein in a simple manner without the need for specialized splicing tools or the like.

It is a related object of the invention to provide such a patch unit where the interconnection of user fibers and jumper fibers may be readily changed within the patch unit in order to accommodate different numbers and arrangements of users.

Because of its compact design, the patch unit is novelly adapted for placement in portions of a communication system which are exposed to the environment. In particular, as will be apparent from the following description, the patch unit may be located in an otherwise conventional splice case located in a manhold or else-where. At the same, the patch unit remains readily accessible to accommodate changing user requirements.

Additional object and advantages of the present invention will be apparent from the following description having reference to the accompanying drawings.

DESCRIPTION OF THE PREFERRED EMBODIMENT

Figure 1:
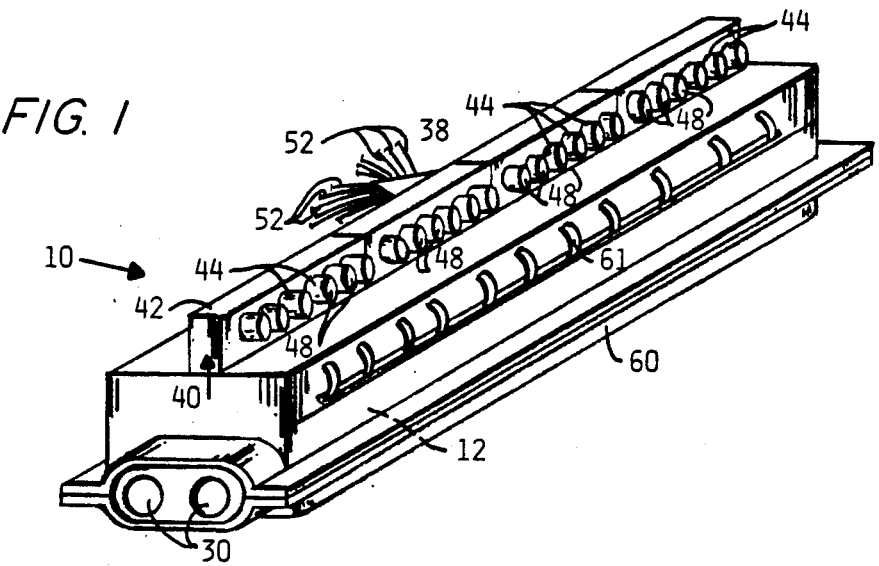
FIG. 1 is a perspective view of a patch unit constructed in accordance with the present invention, the patch unit being combined in FIG. 1 with a splice chamber and part of a cover for containing the patch unit and splice chamber.

Referring now to the drawings, the present invention provides a patch unit 10 which is preferably contemplated for use at selected locations along a continuous optical fiber primary loop in a fiber optic distribution system for providing selective communication access from a central office to one or more users. Such a fiber optic distribution system including a continuous optical fiber primary loop is disclosed in detail with the co-pending reference noted above. Accordingly, in order to assure a complete understanding of the present invention, that co-pending reference is incorporated herein as though set forth in its entirety.

Figure 3:
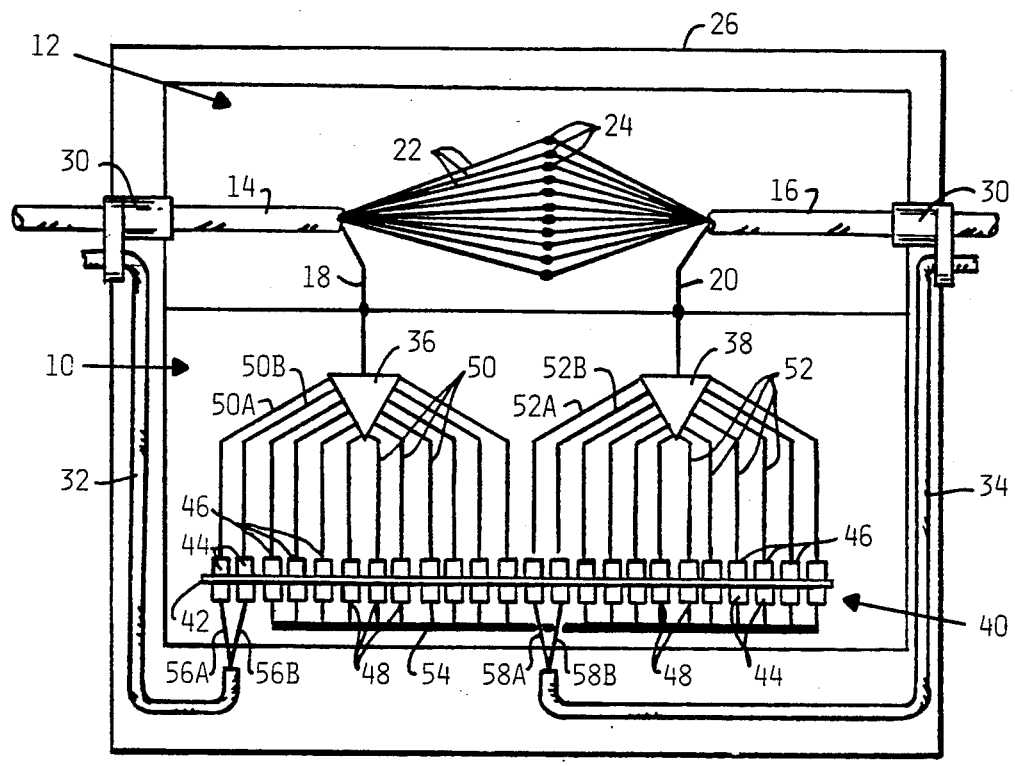
FIG. 3 is a schematic representation of the patch unit and splice chamber while further illustrating the manner in which the patch unit and splice chamber are interconnected within a fiber optic distribution system.

Referring particularly to FIG. 3, the patch unit 10 and an associated splice chamber 12 provide an interconnection between opposite ends 14 and 16 of a feeder cable. The cable portions 14 and 16 preferably represent a continuous optical fiber primary loop of the type disclosed in the co-pending reference noted above. As indicated above, the patch unit 10 provides communication access to one or more users while otherwise providing continuity in additional fibers of one fiber set, opposite ends of which are indicated at 18 and 20. Continuity for additional sets 22 is provided within the splice chamber 12 in a manner described in greater detail below.

As indicated in FIG. 3, the splice chamber 12 preferably includes splice means 24 for establishing continuity in each of the additional optical fiber sets 22. Preferably, as is discussed in substantial detail within the co-pending reference noted above, the additional optical fiber sets 22 may be employed in connection with similar patch units (not shown) arranged in spaced apart relation within the primary loop formed by the feeder cable 14, 16.

Figure 2:
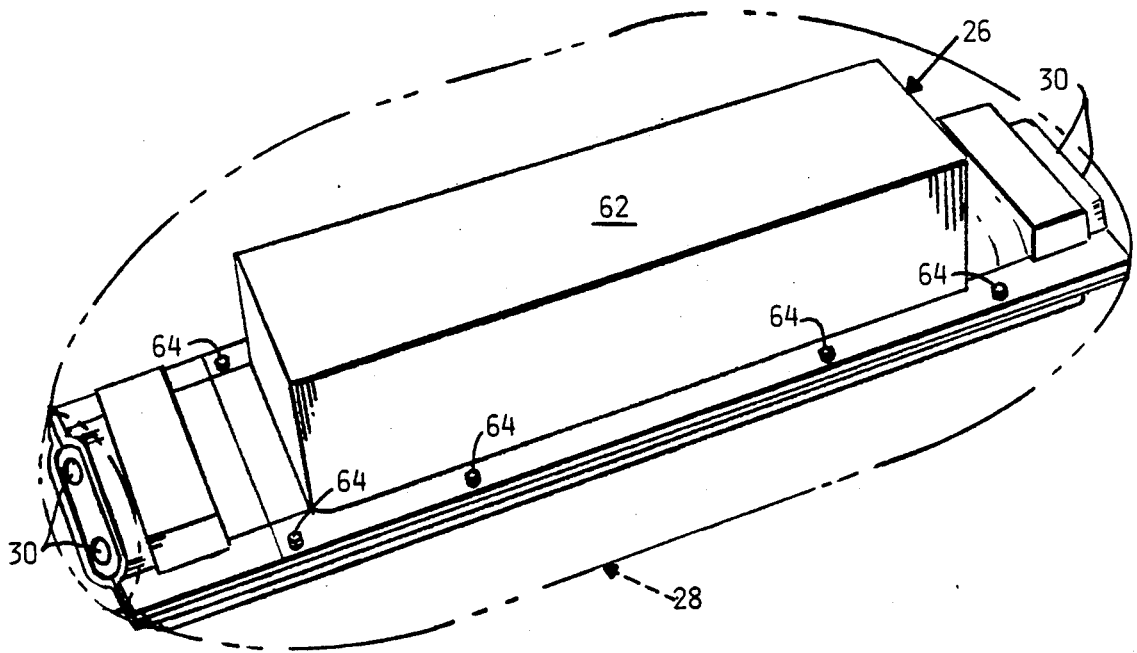
FIG. 2 is a view of the patch unit and splice chamber of FIG. 1 completely enclosed within the cover and illustrating in phantom a splice case forming an outer housing for protecting the entire assembly.

In order to provide protection for both the patch unit 10 and the splice chamber 12, they are arranged within a cover unit 26 which in turn may be arranged within an outer housing or splice case as partially indicated at 28 in FIG. 2. The splice case 28 is of otherwise conventional configuration and mates with the grommet means 30 to seal the interior of the case 28. The case 28 is filled with air or an inert gas, for example, and provides protection for the patch unit and splice chamber from the environment, particularly from water.

Grommet means 30 are arranged at opposite ends of the cover 26 of FIG. 2 in order to provide openings for access of the feeder cable portions 14 and 16 thereinto. The grommets 30 are formed with multiple openings in order to also permit drop cables or secondary user fibers or loops such as those indicated at 32 and 34 to be in communication with the patch unit 10. As will be described in greater detail below, the cables or fibers 32 and 34 serve to interconnect selected users with the primary loop represented by the feeder cable portions 14 and 16.

Within the cover 26, both ends 14 and 16 of the feeder cable enter the splicing chamber 12. Preferably, the feeder cable comprises 144 separate optical fibers, in the form of 12 sets of 12 fibers each. The fiber sets are preferably formed in a generally conventional manner as fiber ribbons with 12 fibers being arranged is side-by-side relation and encased between parallel strip of flexible plastic (not shown). In any event, 11 of the optical fiber sets, indicated collectively at 22, are interconnected by the splice means 24 as described above. Thus, these additional fiber sets 22 are available for providing similar service at different locations through additional patch units, related splice chambers, etc.

The one optical fiber ribbon or set represented by the opposite ends 18 and 20 is interconnected with first and second fanouts 36 and 38 forming part of the patch unit 10. Within the respective fanouts 36 and 38, the 12 individual fibers from each ribbon portion 18 and 20 are separated from each other and respectively interconnected with an array of 24 connectors generally indicated at 40. The connector array 40 includes an elongated plate 42. Each connector 44 in the connector array 40 is of tubular configuration, the 24 tubular connectors being mounted upon the plate 42 with oppositely facing ports 46 and 48 being adapted for receiving optical fibers to place them in communication access with each other through each of the connectors. Thus, the connectors 44 are of generally conventional construction apart from the particular combination of the present invention.

The 12 individual fibers indicated at 50 and the 12 individual fibers 52 extending from the second fanout are interconnected with ports 46 on one side of the connectors 44. With the connectors being mounted upon the elongated plate 42, the opposite ports 46 for all of the connectors are thus arranged in readily accessible alignment.

As noted above, the patch unit 10 is contemplated for either providing user access to selected ones of the fibers 50 and 52 or else establishing continuity for those fibers through the patch unit. Accordingly, any number of user fibers may be interconnected within the primary loop represented by the feeder cable portions 14 and 16. Any fibers which are not used at any time for user access are interconnected by jumper fibers 54 in order to provide continuity in the manner described above.

As illustrated in FIG. 3, two fibers 50A and 50B from the first fanout 36 and two corresponding fibers 52A and 52B from the second fanout 38 are interconnected respectively with user fibers 56A, 56B and 58A, 58B. To provide that interconnection, the user fibers 56A, 56B and 58A, 58B are respectively arranged in ports 48 of connectors 44 opposite ports 46 for the fibers 50A, 50B and 52A, 52B.

The user fibers 56A and 56B form the drop cable 32 referred to above while the user fibers 58A and 58B form the other user drop cable 34. The ports 48 for all of the remaining connectors 44 opposite unused fibers 50 and 52 from the first and second fanouts are respectively interconnected by means of the jumper fibers 54 in order to provide continuity for all fibers from the fiber sets 18 and 20 which are not interconnected with users within the patch unit 10.

It is to be understood that any number of the jumper fibers 54 may readily be removed in order to permit additional user access to the communication loop in the same manner illustrated above for the user cables 32 and 34. The grommet means 30 are also adapted for accommodating various numbers of user cables.

Referring now to FIG. 1, the patch unit 10 is preferably arranged above and overlaps the splice chamber 12 (the splice chamber 12 thus being hidden from view in FIG. 1). The connector array 40 is mounted on top of the patch unit 10 in order to further increase accessibility to the connector ports 48. Note in FIG. 1 that the patch unit and splice chamber are illustrated without the fibers or cables except for the fibers 52 existing from the second fanout 38. The first fanout 36 is arranged behind or below the connector array as seen in FIG. 1. The remaining fibers have been removed from FIG. 1 in order to better illustrate construction of the patch unit 10 and associated components.

It is of course necessary that the optical fibers be arranged with minimum curvature in order to allow light transmission therethrough and to prevent breakage of the fibers. Accordingly, an array of open rings 61 is formed along the side of the patch unit 10 for positioning the cables and fibers. In addition, it may be noted from FIG. 1 that space is provided beneath the splice chamber 12 so that the various cables and fibers being introduced into the patch unit 10 and splice chamber 12 may be formed with "FIG. 8" loops (not shown) in order to provide additional fiber in case of fiber breakage in either the patch unit or splice chamber. The use of such loops for providing additional fiber for this purpose is of course well known.

With the cables and fibers being interconnected through the connectors 44 of the patch unit 10, the patch unit and splice chamber are preferably enclosed within the cover 26 as illustrated in FIG. 2 in order to protect the patch unit 10, the splice chamber 12 and the exposed fibers from the environment. The cover 26 preferably includes a base 60 for receiving and mounting the splice chamber 12 and patch unit 10 as well as a removable portion 62. As illustrated in FIG. 2, the removable portion 62 is preferably secured to the base 60 for example by screws 64. Thus the removable portion 62 may be securely held in place to protect the patch unit 10 and splice chamber 12. On the other hand, the removable portion 62 may readily be removed in order to expose the patch unit and splice chamber as illustrated in FIG. 1 in order to further facilitate the interconnection of additional users or to rearrange connections for existing users within the patch unit 10.

Accordingly, there has been described a novel patch unit for use in fiber optic distribution systems or the like. Various modifications will be apparent from the preceding description in addition to those specifically set forth. Accordingly, the scope of the invention is defined only by the following appended claims.

What is claimed is:

1. A patch unit for use in a fiber optic distribution system or the like including a cable formed with a plurality of optical fibers, said patch unit providing means for selectively accessing one or more of the optical fibers and for maintaining continuity in additional optical fibers, said patch unit comprising:

a housing having an interior compartment;

cable receiving means mounted on said housing for receiving and supporting opposite ends of said cable within said housing; and a plurality of optical fiber connectors each including first and second opposed ports adapted for respectively receiving optical fibers and establishing communication access therebetween, said first ports of said optical fiber connetors being positioned within said housing in an array for receiving the ends of the plurality of optical fibers in the cable, said second ports of said connectors being disposed outside said housing in an accessible array for facilitating eelective connection thereto of user fibers for establishing communication access with selected fibers from the cable and for facilitating connection thereto of jumper fiber for establishing continuity in remaining fibers in the cable; and environmental enclosure means for enclosing said housing and for protecting said optical fibers from adverse enironmental conditions, said environmental enclosure comprising:

a base including means for mounting said housing thereon and orifice means for providing cable access to the interior of said housing means, said orifice means including grommet means for preventing foreign matter from entering the interior of said housing through said orifice means; and cover means for providing removable access to said housing, said cover means being coupled to said base by screw means, said cover means in conjunction with said base means forming a chamber enclosing said housing, wherein said housing comprises an elongated element, and wherein said plurality of optical fiber connectors is mounted upon said elongated element, said connectors being of tubular configuration for mounting on said elongated element with their first and second opposed ports in respective alignment.

* * * * *